United States Patent [19]
Lycan et al.

[11] Patent Number: 5,815,938
[45] Date of Patent: Oct. 6, 1998

[54] PNEUMATIC HOSE COUPLER GAGE

[75] Inventors: Goodwin A. Lycan; Dieter Timm, both of Stevensville, Mich.

[73] Assignee: G.A.L. Gage Company, Stevensville, Mich.

[21] Appl. No.: 713,414

[22] Filed: Sep. 13, 1996

[51] Int. Cl.⁶ ...................................................... G01B 3/56
[52] U.S. Cl. .................. 33/501; 33/534; 33/800
[58] Field of Search .............................. 33/501, 534, 538, 33/544.3, 548, 558.01, 558.2, 558.4, 201, 424, 465, 471, 495, 800, 807, 827, 832, 833

[56] References Cited

U.S. PATENT DOCUMENTS

| | | | |
|---|---|---|---|
| 1,483,935 | 2/1924 | Golden | 33/471 |
| 2,039,718 | 5/1936 | Johanson | 33/800 |
| 2,641,842 | 6/1953 | Porter, Jr. | 33/471 |
| 2,689,406 | 9/1954 | Stromquist | 33/495 |
| 5,172,484 | 12/1992 | Triola | 33/534 |

*Primary Examiner*—Thomas B. Will
*Assistant Examiner*—Andrew Hirshfeld
*Attorney, Agent, or Firm*—Baker & Daniels

[57] ABSTRACT

A gage according to the present invention for use in measuring engagement parts of a pneumatic hose coupler and including a body and a spring loaded contact rotatably mounted to the body. The body includes an alignment part for locating the gage on the coupler and a member for contacting one of the engagement parts. The contact is biased into contact with another of the engagement parts and calibrated indicator marks provide a visual indication of the angular distance between the two parts. Sights through the gage measure another angular dimension between coupler engagement parts. The gage also includes a plug part for measuring vertical clearance between other parts of the coupler.

13 Claims, 8 Drawing Sheets

PNEUMATIC HOSE COUPLER GAGE

FIELD OF THE INVENTION

The present invention relates to gage for measuring dimensions between critical parts of pneumatic hose couplers.

BACKGROUND OF THE INVENTION

The air supply used in train braking systems is distributed from railroad car to railroad car through pneumatic hoses connected together by hose couplers. The connected couplers are held together by pairs of rotatably interlocked flanges. Service vibration and repeated connection and disconnection of the couplers gradually wears the contacting surfaces of the connected couplers and may result in air loss and perhaps even brake failure. Thus, it is important to measure each coupler to determine if it should be rejected or replaced due to out-of-tolerance dimensions resulting from manufacturing variations, wear or other damage.

Conventional gages for measuring couplers employ two stacked discs which rotate relative to one another. The lower disc has a pivot lug to seat the gage on the central bore of the coupler and a finger which contacts an abutting edge of the coupler stop lug. The upper disc has another finger for contacting an abutting edge of the coupler guard arm. The user holds the lower disc so that the lower finger contacts the first abutting edge while simultaneously rotating the upper disc so that the upper finger contacts the second abutting edge. By observing a set of indicator marks on the gage, the user determines the acceptability of the angular displacement between the coupler stop lug and guard arm.

Such conventional gages are awkward to use. Since both discs are positioned manually, the user must typically use both hands to operate the gage, requiring that the coupler be propped in place or otherwise stabilized. Alternatively, the user uses one hand to both hold the coupler and urge the lower finger into position, and the other hand to rotate the upper finger into position. Either situation is undesirable because of the level of manual dexterity required. Furthermore, the difficulties in using such gages may increase the time required for measuring each coupler and the likelihood of erroneous measurements.

SUMMARY OF THE INVENTION

The present invention provides a gage for measuring pneumatic hose couplers by employing a spring loaded contact for automatically contacting an edge of the coupler guard arm, thereby permitting one-handed operation of the gage. The invention includes, in one form thereof, a body and a spring loaded contact pivotally connected to the body. The body includes a locator part to locate the gage over the coupler central bore and a leg for contacting the coupler stop lug. The user holds the coupler with one hand and positions the body with the other hand. The spring loaded contact is automatically urged into engagement with the coupler guard arm. Measurement marks on the contact and on the body visually indicate the acceptability of the angular separation between the coupler stop lug and guard arm.

Accordingly, an object of the invention is to provide a pneumatic hose coupler gage which measures the angular separation between critical parts of pneumatic hose couplers.

Another object of the present invention is to provide a pneumatic hose coupler gage which can easily be operated with one hand.

BRIEF DESCRIPTION OF THE DRAWINGS

The above-mentioned and other objects and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE INVENTION

The embodiments herein described are not intended to be exhaustive or to limit the invention to the precise forms disclosed. Rather, the embodiments selected for the description are disclosed so that others skilled in the art may utilize their teachings.

Referring now to FIGS. 1–5, gage 10 includes a body 12 which is preferably machined from a block of durable, light weight material such as aluminum. Body 12 includes a disc-shaped locator part 14 from which extends a cylindrical protrusion 16. A grip portion 18 of body 12 extends from locator part 14. A leg 20 extends downwardly from body 12, spaced outwardly of and below locator part 14 and includes a contacting surface 22. Body 12 includes a guide slot 24 which extends toward grip 18 to a pivot pin 28 centrally disposed over locator part 14. A bore 30 is formed in one side of guide slot 24. A minimum limit mark 32 and a maximum limit mark 34 are inscribed on the upper surface of body 12 at specific angular distances relative to contacting surface 22 of leg 20.

Additionally, grip 18 includes a plug part 36 which extends outwardly from locator part 14 and terminates in a curved end 38 having a beveled edge 40. Narrow lip sight 43 and wide lip sight 42 extend through plug part 36. Plug part 36 has a first thickness 44 extending radially inwardly from curved end 38 which transitions at curved step 46 to a second thickness 48.

Figures 1, 2, 3:
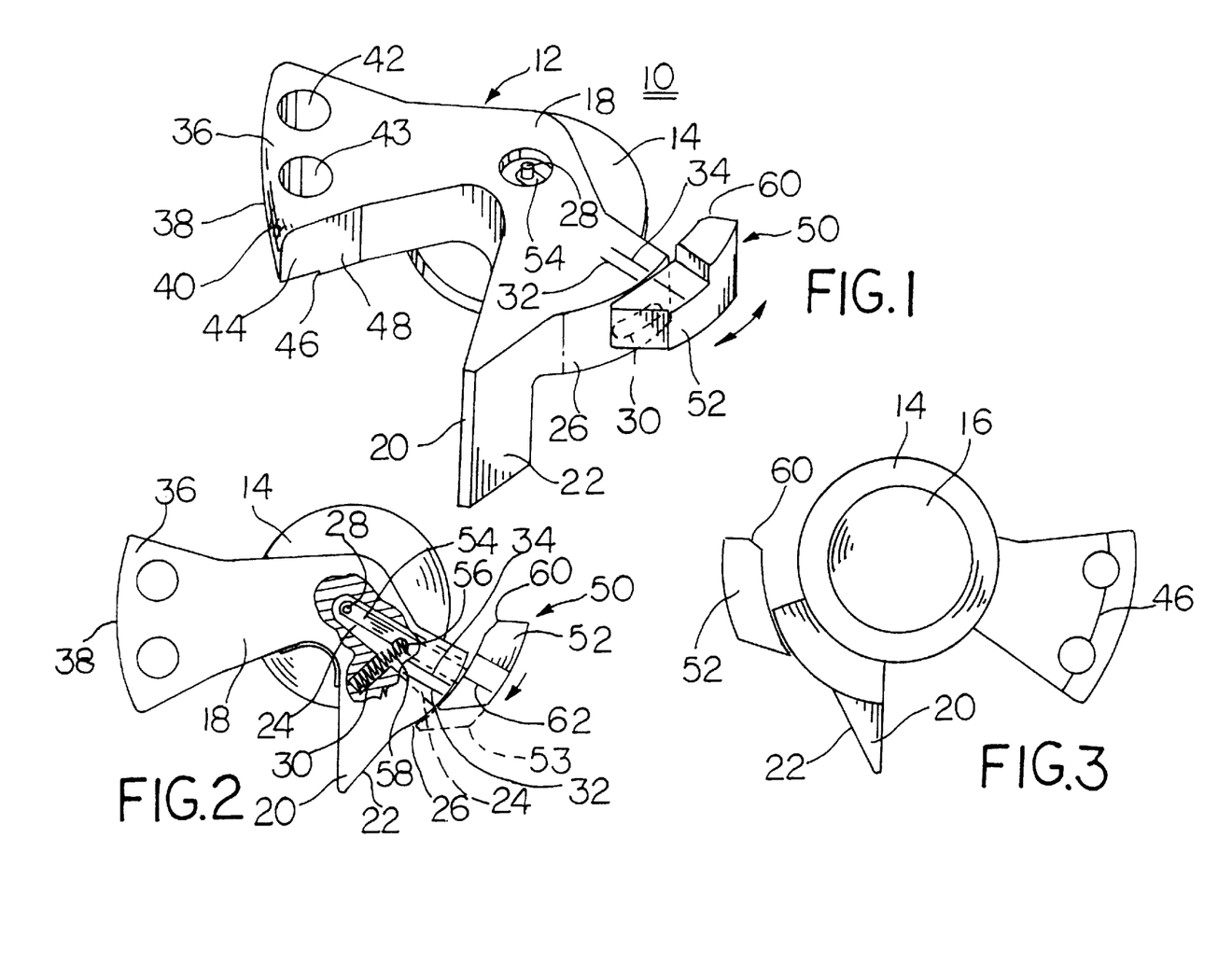
FIG. 1 is a perspective view of the gage of the present invention.
FIG. 2 is a top plan view of the gage of FIG. 1 with portions thereof broken away to reveal internal components.
FIG. 3 is a bottom plan view of the gage of FIG. 1.
Figure 4:
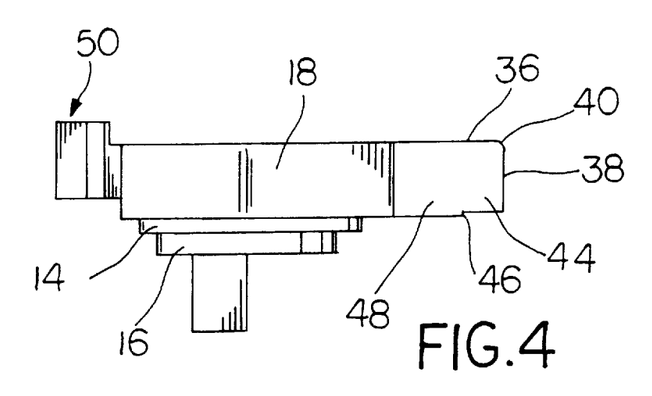
FIGS. 4 and 5 are side elevational views of the gage of FIG. 1.
Figure 5:
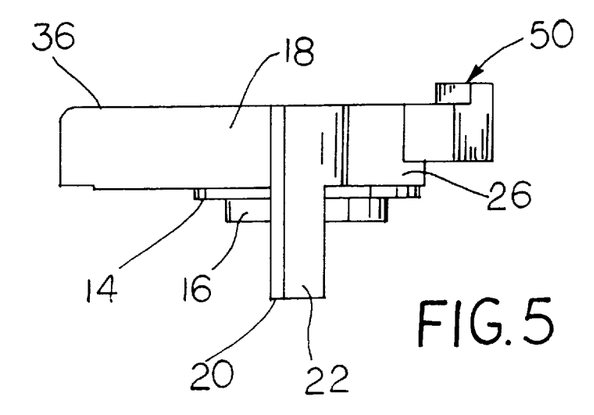
Figure 6:
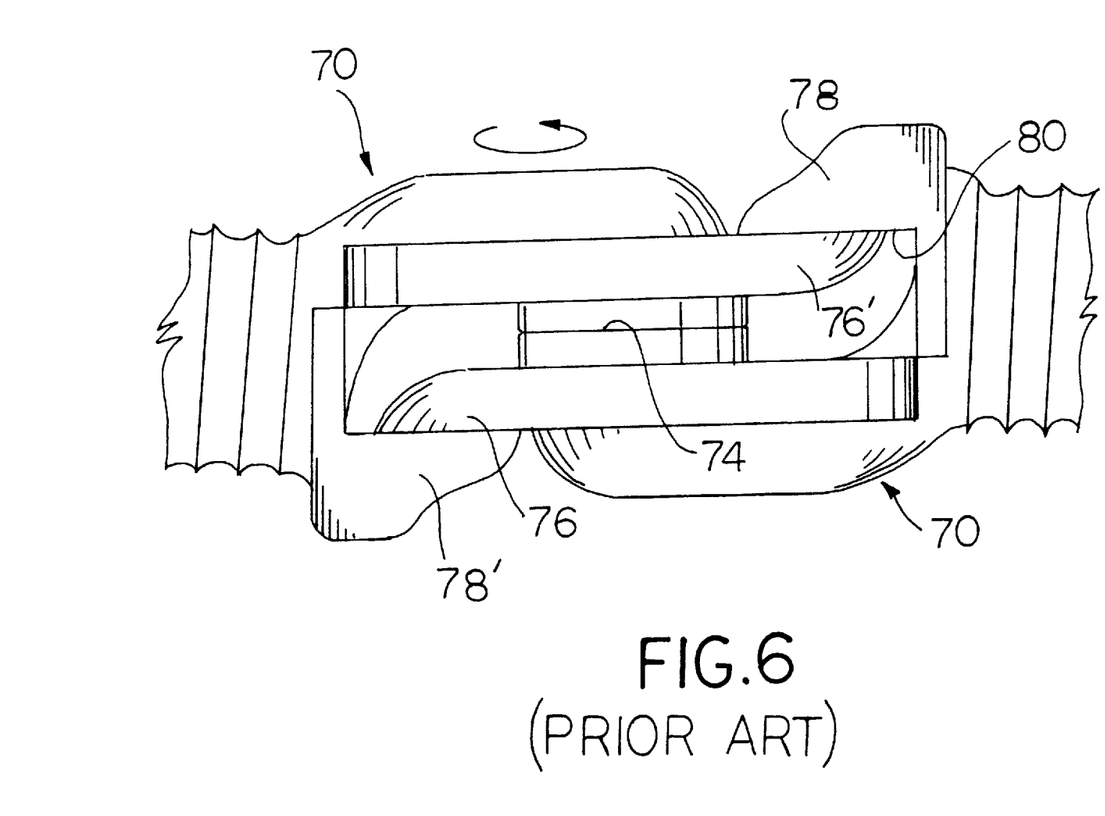
FIG. 6 is a fragmented side elevational view of a pair of connected couplers.

As best shown in FIGS. 1 and 2, gage 10 includes a finger contact 50 with a head 52 and a stem 54 which pivots on pivot pin 28 within guide slot 24 to move head 52 between a retracted position (broken lines 53) and an extended position, shown in solid lines. A notch 56 is formed on stem 54 in alignment with bore 30. A helical spring 58 is situated within guide slot 24 and compressed between bore 30 and notch 56 to bias contact 50 toward its extended position. Head 52 includes a contacting surface 60 and carries a measurement mark 62 located a specific distance from contacting surface 60.

Figure 7:
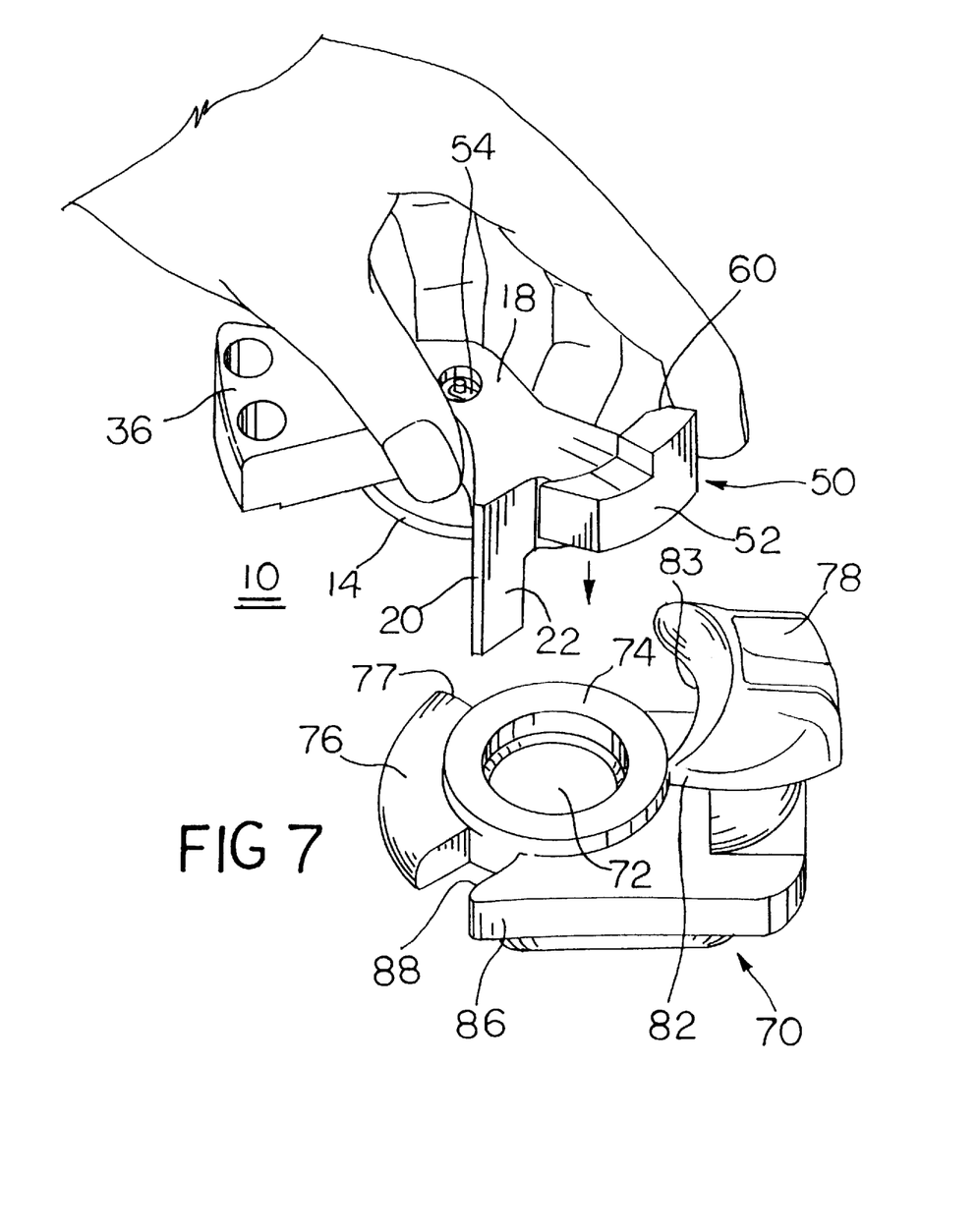
FIG. 7 is a perspective view of the gage of the present invention being installed onto a coupler.

FIG. 7 shows a pneumatic hose coupler 70 measured by gage 10. Each coupler 70 includes a central bore 72 with a smooth annular surface 74 which mates with a corresponding annular surface of a similar coupler to facilitate air passage between the couplers. Pairs of similar couplers 70 are held together by pairs of interlocking flanges (lip 76 interconnecting with guard arm 78' and lip 76' interconnecting with guard arm 78). Flange or guard arm 78 includes a lower surface 80 in spaced, parallel relationship to annular surface 74, a leading edge 82, and a following curved inner edge 83. Flange or lip 76 includes edge 77. As best shown in FIG. 7, each coupler 70 includes a flange 86 which includes a stop lug 88 that abuts edge 82 of guard arm 78,78' when a pair of couplers are mated.

It is important that the angular distance of each coupler between stop lug 88 of flange 86 and edge 82 of guard arm 78 is within certain tolerance limits to ensure that the coupler will mate properly with other similar couplers, even after normal wear encountered over the span of the coupler's service life. It is also important that the spacing between annular surface 74 and lower surface 80 of guard arm 78 fall within certain tolerance limits. Finally, the distance between edge 77 of lip 76 and stop lug 88 of flange 86 is important. Gage 10 provides these measurements as described below.

Mode of Operation

Figure 8:
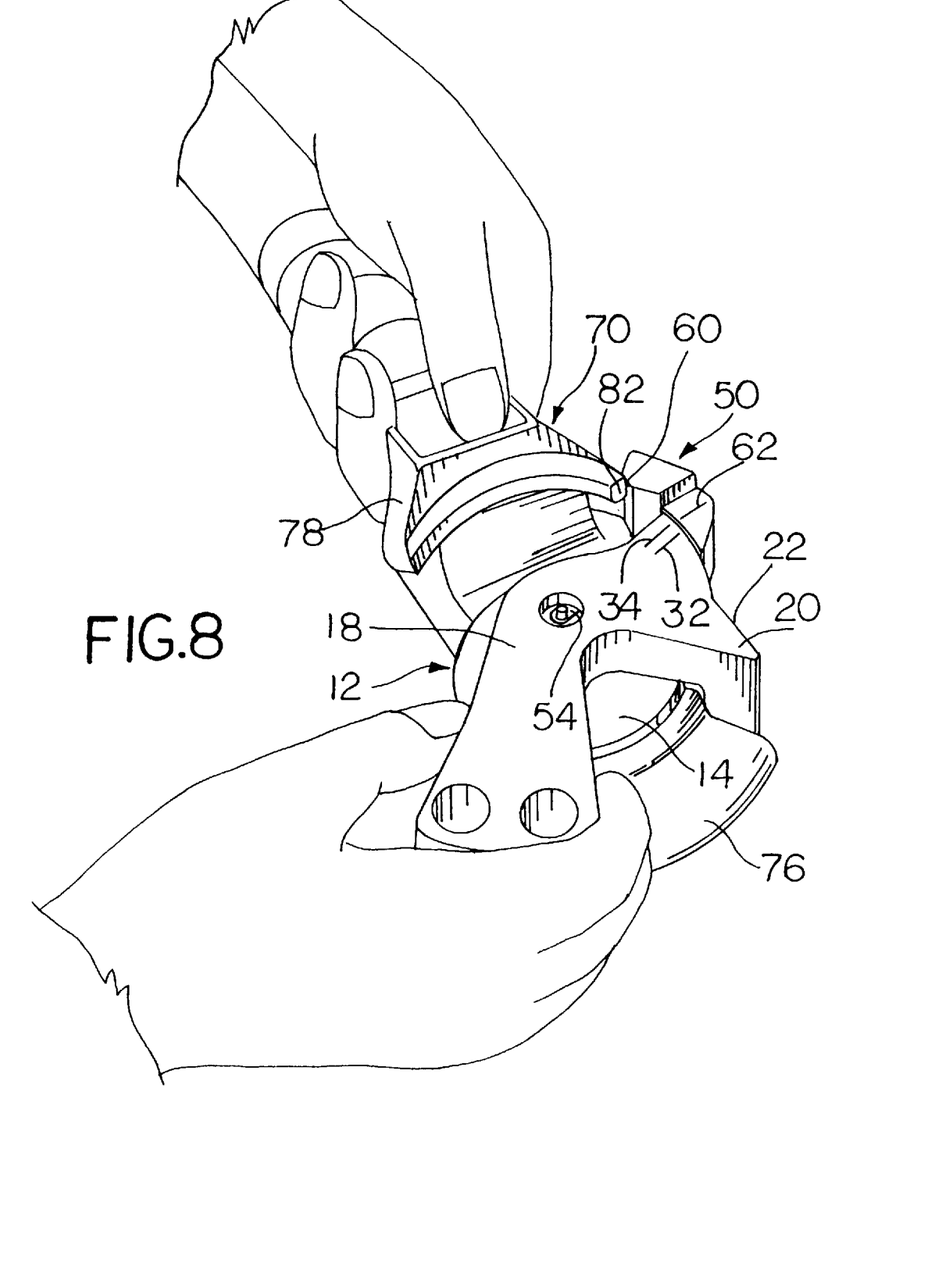
FIG. 8 is a perspective view of the gage of the present invention measuring a coupler.
Figure 9:
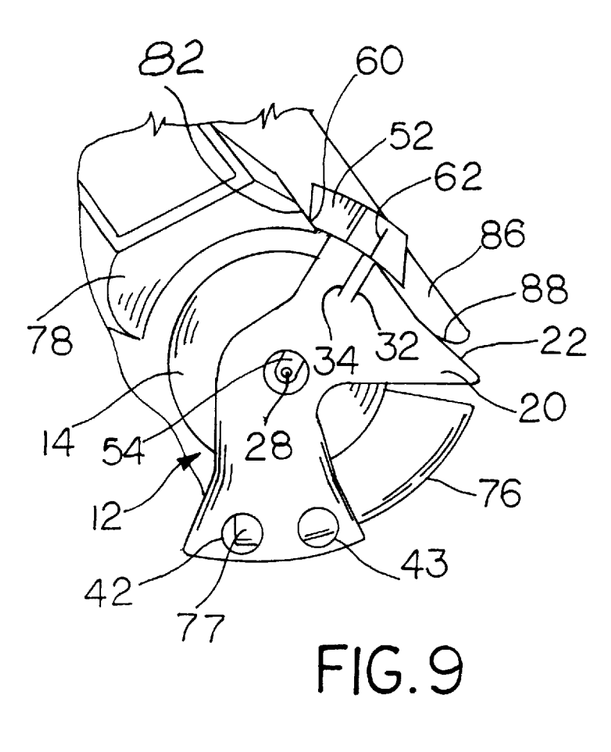
FIG. 9 is a fragmentary top plan view of the gage and coupler of FIG. 8 illustrating coupler measurements.
Figure 10:
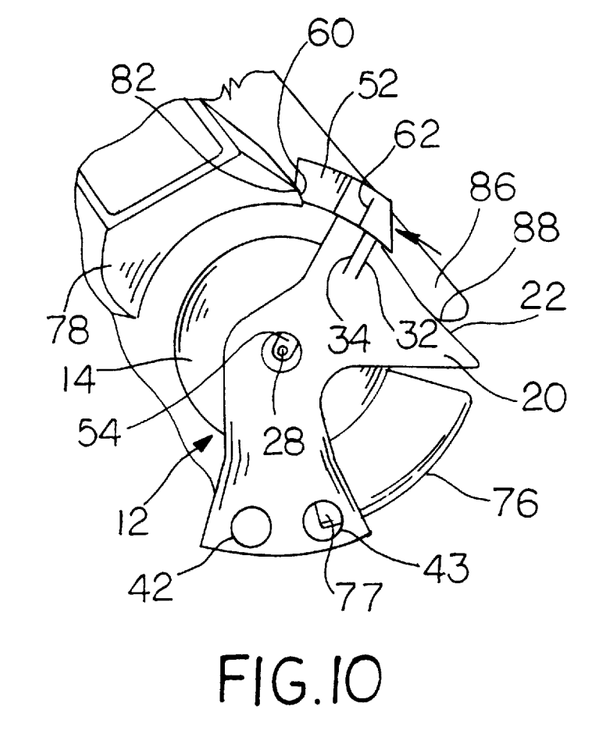
FIG. 10 is a fragmentary top plan view similar to FIG. 9.

As shown in FIGS. 7 and 8, the user grips gage 10 by grip portion 18 and compresses spring 58 by rotating contact 50 toward leg 20 with a finger of one hand. The user holds coupler 70 in position with the other hand. Gage 10 is lowered onto coupler 70 so that leg 20 fits between lip 76 and stop lug 88 of flange 86. Protrusion 16 fits snugly but rotatably into coupler central bore 72 at annular coupler surface 74. Protrusion 16 prevents gage 10 from shifting radially relative to the coupler, and the contact between locator part 14 and coupler surface 74 positions the gage vertically. As shown in FIG. 8, contact 50 is then released by the user so that head 52 rotates under the bias of spring 58 until its contacting surface 60 contacts edge 82 of guard arm 78. At substantially the same time, the user rotates body 12 slightly in a counter-clockwise direction to cause contacting surface 22 of leg 20 to contact stop lug 88 of flange 86. With contact 50 in contact with guard arm edge 82 and leg 20 in contact with flange stop lug 88, the user observes the position of measurement mark 62 relative to limit marks 32,34. If the angular distance between guard arm edge 82 and stop lug 88 is within acceptable limits, measurement mark 62 on head 52 will be positioned between minimum limit mark 32 and maximum limit mark 34 on body 12 as shown in FIG. 9. If the angular distance is too great because, for example, guard arm edge 82 is worn, measurement mark 62 will come to rest at a location beyond maximum limit mark 34 as shown in FIG. 10.

While retaining gage 10 in the above-described position, the user looks through one of sights 42 or 43 to determine the acceptability of the angular distance between edge 77 of lip 76 and stop lug 88. A wide lip coupler is acceptable if edge 77 is visible through wide lip sight 42 when contacting surface 22 abuts stop lug 88 as shown in FIG. 9. A narrow lip coupler is acceptable if edge 77 is visible through narrow lip sight 43 as shown in FIG. 10.

Figure 11:
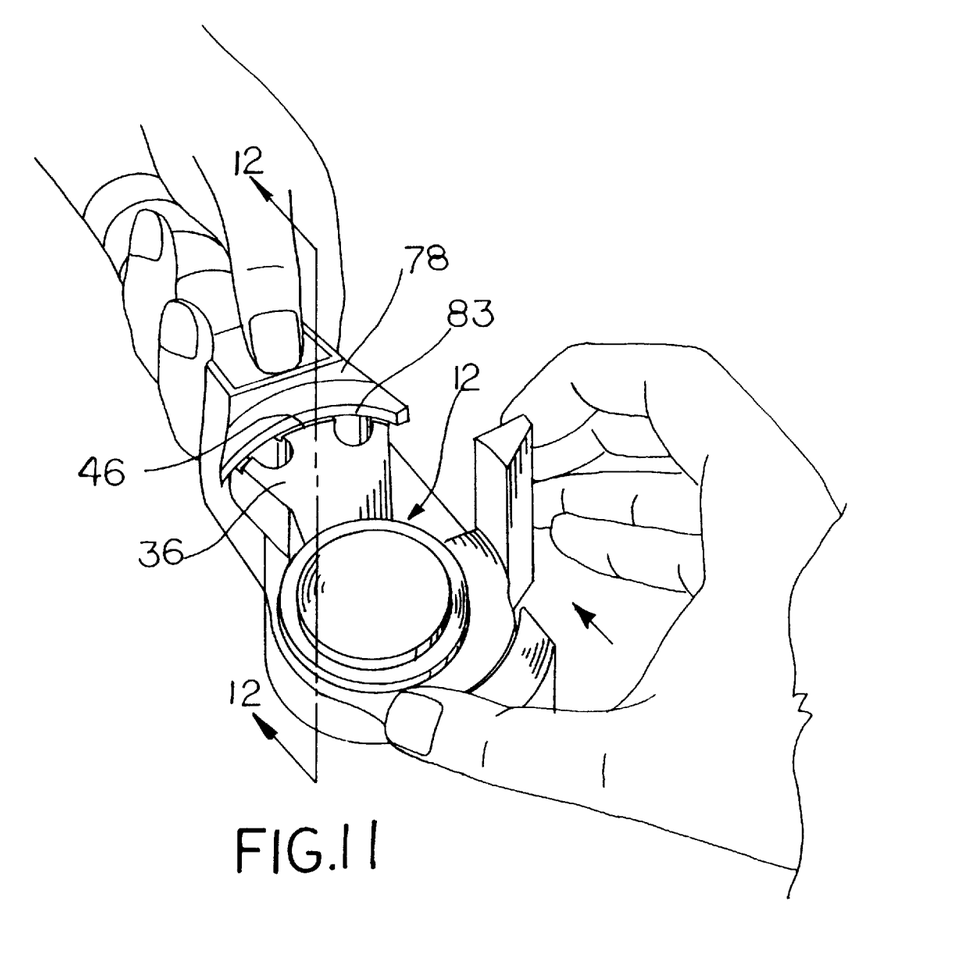
FIG. 11 is a perspective view of the gage of the present invention measuring another dimension of a coupler.
Figure 12:
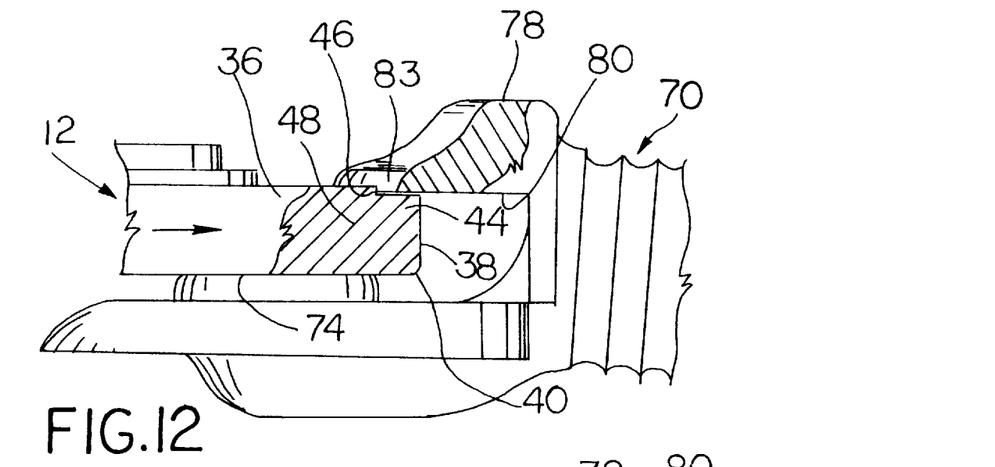
FIG. 12 is a partially fragmented side elevational view taken substantially along line 12—12 of FIG. 11 illustrating an acceptable coupler measurement.
Figure 13:
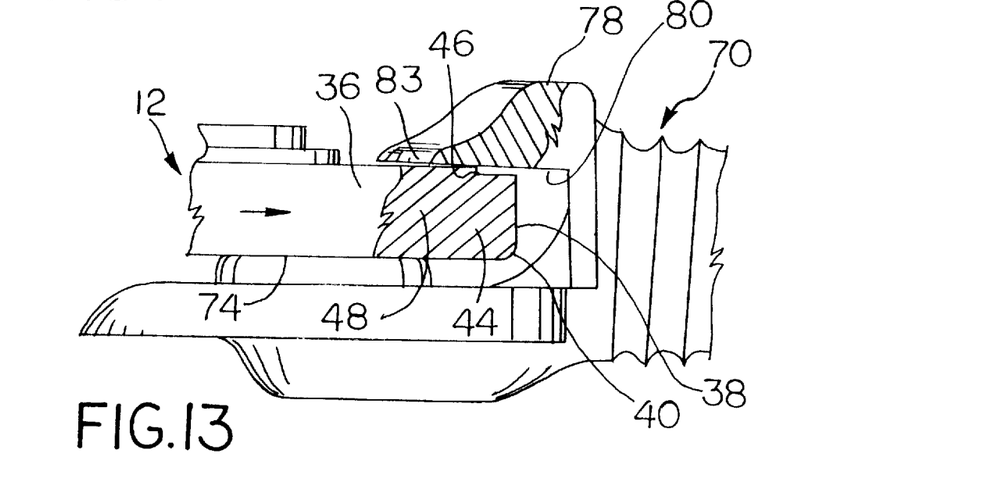
FIG. 13 is a partially fragmented side elevational view similar to FIG. 12 illustrating an unacceptable coupler measurement.

As shown in FIGS. 11–13, the user employs gage 10 to measure the spacing between lower surface 80 of guard arm 78 and annular surface 74 by reversing gage 10 and placing it on top of annular surface 74. Plug part 36 is slid toward curved inner edge 83 of guard arm 78. If first thickness 44 slides under bottom surface 80 and step 46 abuts curved inner edge 83, the spacing is acceptable (FIGS. 11 and 12). If second thickness 48 slides under bottom surface 80, the spacing is too great (FIG. 13). If curved end 38 of plug part 36 engages curved inner edge 83 such that first thickness 44 does not slide under bottom surface 80, the spacing is unacceptably small.

While this invention has been described as having an exemplary embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. For use with a pneumatic hose coupler having a central bore, an annular surface surrounding said bore, a first flange adjacent to said central bore and having an edge, and a second flange having an edge angularly spaced from said first flange edge, a gage for measuring the angular distance between said first flange edge and said second flange edge comprising:

a body including
a downwardly turned member configured to abut said coupler first flange edge, and
an alignment part for engaging said coupler annular surface, said alignment part having a cylindrical protrusion for insertion into said coupler bore, said protrusion having a diameter approximately the diameter of said bore;
a contact pivotally attached to said body and configured to contact said coupler second flange edge; and
a spring disposed between said body and said contact biasing said contact away from said member,
at least one of said contact and said body carrying indicia thereon for indicating displacement of said contact from said member,
wherein when said alignment part engages said coupler annular surface with said protrusion inserted into said coupler bore, and said member abuts said coupler first flange edge, said spring biases said contact away from said member into contact with said coupler second flange edge with said indicia representing the gaged distance between said coupler first flange edge and said coupler second flange edge.

2. The gage of claim 1 wherein said alignment part is disc-shaped having a diameter larger than said coupler bore so that with said protrusion fitted into the coupler bore said alignment part will slideably rotate on said coupler annular surface.

3. The gage of claim 1 further comprising a pivot pin mounted on said body and connecting said contact to the body.

4. The gage of claim 3 wherein said contact includes a stem and a head at one end of said stem, the other end of said stem pivotally connected to said pivot pin, said head located outwardly of said body and shiftable with said stem about said pivot pin between a retracted and an extended position, said spring biasing said head from its said retracted position into its said extended position.

5. The gage of claim 4 wherein said body has a side with a guide slot extending inwardly therefrom to said pivot pin, said stem located within said slot and movable therein as said head shifts between said retracted position and said extended position.

6. The gage of claim 5 wherein said spring extends between said body and said stem.

7. The gage of claim 1 wherein said body includes a grip by which said body can be rotated relative to said coupler when said alignment part protrusion is inserted into said coupler bore.

8. The gage of claim 1 wherein said indicia includes a minimum limit mark, a maximum limit mark and a measurement mark, said minimum limit mark and said maximum limit mark being imprinted on said body in spaced angular relationship to said member defining an acceptable angular range therebetween, said measurement mark being imprinted on said contact for alignment with said acceptable angular range when said contact contacts the coupler second flange edge at an acceptably angularly spaced relationship from the coupler first flange edge.

9. The gage of claim 1 wherein said coupler second flange also includes an under surface spaced from said coupler annular surface, said body including a plug part for measuring the spacing between said under surface and said coupler annular surface when inserted therebetween, said plug part having a first thickness and a second thickness with a step defining the transition between said first thickness and said second thickness, whereby when said step abuts said second flange with said plug part first thickness disposed between said under surface and said coupler annular surface, said spacing is acceptable.

10. The gage of claim 1 wherein said coupler includes a radially extending lip having an edge angularly spaced from said coupler first flange edge, said body including a gaging sight to measure said angular spacing between said coupler lip edge and said coupler first flange edge when said alignment part engages said coupler annular surface with said protrusion inserted into said coupler bore, and said member abuts said coupler first flange edge.

11. The gage of claim 10 wherein said gaging sight includes an opening extending through a plug part in said body, said opening constituting means for viewing said coupler lip when said coupler lip edge is acceptably angularly spaced from the coupler first flange edge.

12. In combination:
   a pneumatic hose coupler and a gage, said pneumatic hose coupler including
      a central bore with an annular surface surrounding said bore,
      a stop ear adjacent said central bore, and
      a flange having an edge angularly spaced from said stop ear;
   said gage for measuring the angular separation between said stop ear and said flange edge, said gage including,
      an alignment part for engaging said coupler annular surface in alignment with said coupler central bore,
      a downwardly extending leg connected to said alignment part for contacting said coupler stop ear,
      a contact pivotally connected to said alignment part for contacting said coupler flange edge,
      biasing means disposed between said alignment part and said contact for urging said contact away from said leg, and
      indicia carried by one of said contact and said alignment part for indicating the position of said contact in relation to said leg,
   whereby when said alignment part engages with said coupler annular surface and said leg contacts said coupler stop ear, said biasing means urges said contact against said flange edge and said indicia indicates said relative position of said contact which corresponds to the angular separation between said coupler stop ear and said flange edge.

13. A method of measuring a pneumatic hose coupler having a central bore, a first flange adjacent to said central bore and having an edge, and a second flange having an edge angularly spaced from said first flange edge, said method comprising using a gage having a body including an alignment part for locating said gage relative to said coupler bore, a leg attached to said body, and a contact pivotally mounted to said body which is spring biased away from said body leg, and indicia carried by one of said body and said contact representing the position of said contact relative to said leg, said method comprising:
   locating said body alignment part over said coupler central bore;
   moving said contact toward said leg;
   releasing said contact which being spring biased is urged into contact with said second flange edge while contacting said first flange edge with said leg; and
   observing said indicia to determine the relative position between said leg and said contact which corresponds to the angular distance between said first flange edge and said second flange edge.

\* \* \* \* \*